May 28, 1929.  E. A. NELSON  1,715,142

METHOD FOR MAKING BLIND NUTS

Filed March 21, 1927

Inventor

EMIL A. NELSON

By John G. ——
Attorney

Patented May 28, 1929.

1,715,142

UNITED STATES PATENT OFFICE.

EMIL A. NELSON, OF DETROIT, MICHIGAN.

METHOD FOR MAKING BLIND NUTS.

Application filed March 21, 1927. Serial No. 176,998.

My invention in general relates to improvements in method for making blind nuts of any desired form or shape, and in particular to improved method for making blind nuts of the variety known as "acorn" nuts.

Heretofore the making of blind nuts has been accompanied by considerable waste of time and material as well as excessive cost of taps. In the old methods, it is customary to produce the original blank by cutting a piece from a bar of hexagonal stock in a screw machine, forming the "acorn" shaped crown in the same operation, considerable material being wasted in shaping the piece. Such a blank is then drilled with a "tap" drill the size of the diameter of the root of the thread. Then follows the tapping operation which is generally prefaced by passing a reamer into the hole thus drilled in order to make the surface of the hole smooth. Then a series of taps are usually employed, the first having a long "lead" and cutting only a portion of the desired thread. This is followed by another tap with less lead cutting more of the thread and finally with a "bottoming" tap with very little lead in order to complete the entire thread clear to the end of the hole. If this final tap should strike the end of the hole due to being fed in too far, the tap is subject to breakage. Another reason for using a series of taps is that considerable heating of the work is present due to the closed hole.

Since in the old method, there is no space for the accumulation of chips produced by the tap, such chips collect in the flutes of the tap and as a result damage to both the thread and the tap occurs when the tap is backed out. In order to have an effective thread of sufficient length it is often necessary by the old method to make the whole nut longer than standard thus wasting useful material. As a result of the possible damage of thread just described it is necessary to make a 100% inspection of finished nuts in order to discard those with damaged threads or effective threads of insufficient length. The damage done to taps in the old method limits the number of holes that can be tapped with a single series of taps, thus increasing the cost of taps per nut. All of the foregoing items make the blind nuts produced by the old method, very expensive.

One of the objects of my invention is to provide a method of forming the blank, prior to the tapping operation, in such a manner that there will be a recess or clearance space at the bottom of the hole in which chips can accumulate without clogging the tap and thereby shortening its life, and into which the end of the tap, or the lead of the tap, can pass, completing the entire thread with a single tap before the end of the tap reaches the end of the hole. My method by reason of this clearance space permits the use of a tap with a very short lead yet enough to properly start and finish the thread with a single operation, and the elimination of chip clogging eliminates the necessity for a 100% inspection of finished nuts. Thus not only is it possible to operate with a single tap, but the number of holes that can be tapped during the life of the tap is far greater than by the former method, and since the class of taps used in this work is comparatively expensive, this saving of taps greatly reduces the final cost of the nuts.

For the purpose of illustration, I have chosen as an example the well known form of nut known as the "acorn" nut, the same being a blind, or cap nut with a hexagonal base to fit a wrench.

Referring to the annexed drawings in which like numerals of reference designate like parts in the several figures:

Figures 1, 2, 3, 4, 5, 6:
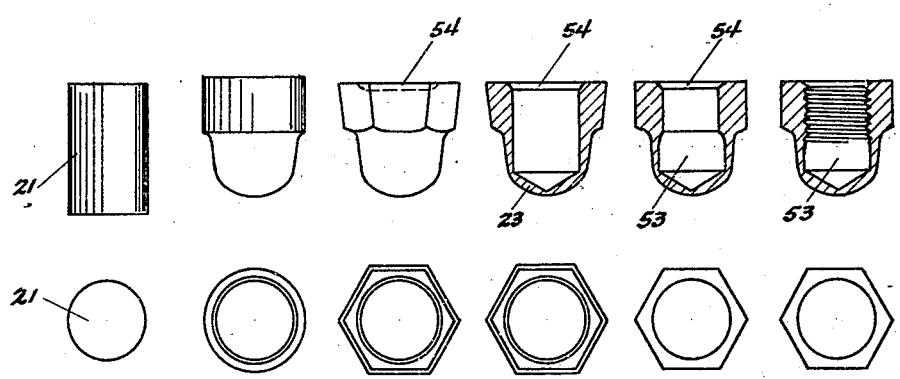
Fig. 1 shows two views of one form of blank used in my new method for making blind nuts.
Fig. 2 shows in two views the piece depicted in Fig. 1 after being partially formed.

Fig. 3, in two views, depicts the piece after undergoing an additional forming operation.

Fig. 4, in two views, one of which is in section, depicts the piece after being drilled.

Fig. 5, in two views, one of which is in section, depicts the piece after being compressed ready for tapping.

Fig. 6, in two views, one of which is in section, shows the final finished nut ready for use.

Figures 7, 8, 9, 10, 11, 12:
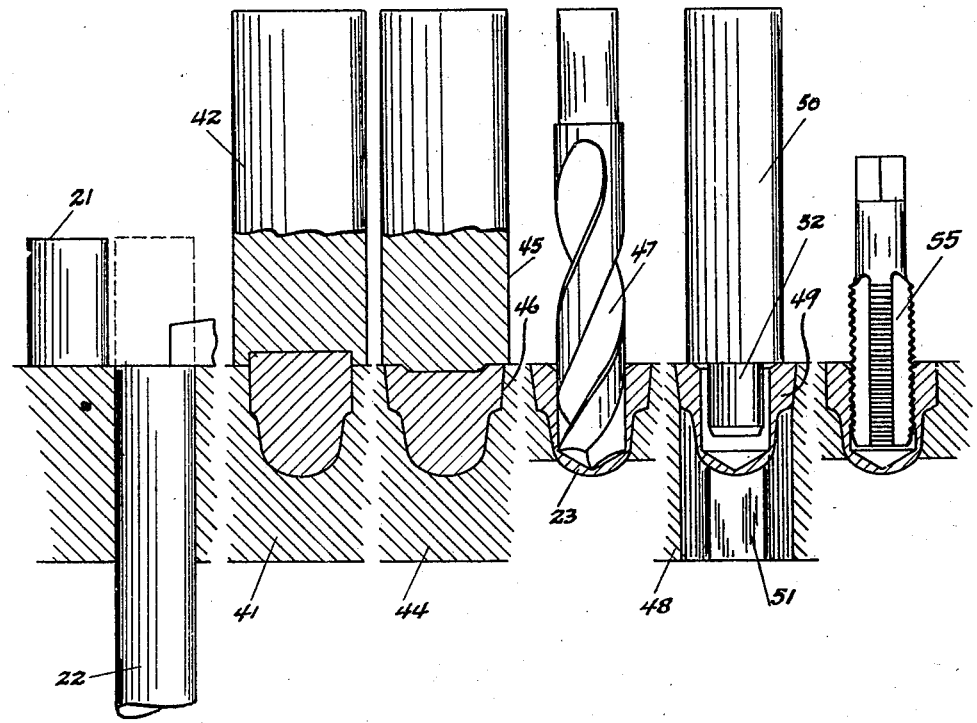

Fig. 7 indicates the cut-off operation producing the piece shown in Fig. 1.

Fig. 8 indicates the forming operation that transforms the piece shown in Fig. 1 into that shown in Fig. 2.

Fig. 9 indicates the next forming operation that transforms the piece shown in Fig. 2 into that shown in Fig. 3.

Fig. 10 indicates the drilling operation whereby the piece shown in Fig. 3 is transformed into that shown in Fig. 4.

Fig. 11 indicates a compressing operation whereby the piece shown in Fig. 4 is transformed into that shown in Fig. 5.

Fig. 12 indicates the tapping operation whereby the piece shown in Fig. 5 is transformed into that shown in Fig. 6.

In the drawings, 21 depicts the original blank, cylindrical in form, being cut cold from a bar of round stock 22 of the desired material (see Fig. 7). The diameter of this piece 21 is approximately the same as the diameter of the round portion of the finished nut.

In the next or second operation (see Fig. 8), this piece 21 is forced into a forming die such as 41 by the plunger 42. This operation may be performed cold and the shape of the impression in the die 41 is imparted to the piece 21 as shown in Fig. 2. In the next or third operation (see Fig. 9), the piece shown in Fig. 2 is placed in die 44 fitting the rounded end of the piece, and the plunger 45 forces the upper portion of the piece out into the tapered hexagonal impression 46 in the die 44, thus shaping the piece to conform to the entire impression in the die as shown in Fig. 3.

In the next or fourth operation, the piece shown in Fig. 3 is drilled as shown in Fig. 10 with a drill 47 that is equal to or slightly larger than the outside diameter of the final thread desired. The drill 47 is run in to a depth that will just leave a thin wall of metal in the hemispherical portion of the piece as at 23, the depth of drilling being gauged by a set stop on the drill press (not shown). In the next, or fifth operation (see Fig. 11), the piece as shown in Fig. 4 is placed in the die 48. In the die 48 is a hexagonal hole slightly tapered at its entrance as at 49, this tapered hole conforming to the tapered portion of the piece. The plunger or ram 50 is of a size that will pass through the lower or straight hexagonal hole 51 in the lower part of the die 48.

The size and form of this straight hexagonal hole 51 in the die 48 is just equal to the external size desired on the finished nut. Integral with the plunger 50 is the mandrel 52 which is cylindrical in form and of a diameter substantially equal to the smallest diameter of the threads which the piece is to be provided with, and which diameter will be substantially the same as the diameter of a drill usually employed for preparing a hole to be tapped for that particular size of thread, and of a length substantially less than the depth of the hole in the piece. The plunger 50 is driven downward thus forcing the piece through the straight hexagonal hole 51 in the lower portion of the die 48.

The extra stock in the enlarged and tapered hexagonal portion of the piece shown in Fig. 4 is forced inwards around the mandril 52, meeting the mandril and leaving a round smooth hole equal in size thereto which as stated above is tap drill size for the desired thread. This operation due to the shape and size of both the die 48 and the mandril 52 leaves the small recess or clearance space 53 as shown, of the original diameter imparted to it by the drill 47 in the fourth operation, see Fig. 5.

We now have a piece as shown in Fig. 5 ready for the sixth operation, Fig. 12. A slight countersink at 54 having been formed in the third operation, makes the entrance of the tap 55 possible when only a small lead on the tap is present, and the depth and the diameter of the recess 53 is made sufficient to allow the lead portion of the tap to pass entirely into the recess and complete the entire thread before the end of the tap strikes the end of the recess. It will thus be seen that a single tap can be employed to both start and finish the complete thread, and that chips can collect in the recess 53 and not cause the tap 55 to clog and injure itself or the finished thread when the tap is backed out of the finished nut.

It should be noted that, if desired, the piece shown in Fig. 4 can be produced directly in a die casting, without going through the prior operations, whereupon the operations indicated in Figs. 11 and 12 can be performed producing in turn the pieces shown in Figs. 5 and 6 respectively.

In the drawings, for convenience, the tools performing the successive operations are shown directly above the piece as fashioned thereby. The piece is carried automatically from one operation to the next by fingers or carrying devices so that all of the operations can be performed on one machine, or the different operations can be served by hand on the same or different machines. It should be noted that as an alternative the piece shown in Fig. 4 could be produced by starting with a bar of hexagonal stock slightly larger than the finished nut, the various forming operations being produced in a screw machine although attended by considerable increase in cost of the original material as well as labor cost and wasted material.

Obviously changes can be made in the mechanisms for performing the successive operations, without departing from the spirit of the invention, by anyone skilled in the art, and I do not care to limit myself to the exact mechanism or external form of nut shown.

What I claim is:

1. The method of forming a blind nut blank that comprises cutting a piece from a bar of stock, shaping said piece into a form larger than and resembling the desired final product, drilling a blind hole in the said piece at least equal to the outer diameter of the desired final thread and finally compressing said piece around a cylindrical mandril whose outer diameter is approximately that of the inner diameter of the desired thread and for a length substantially less than the depth of the said drilled hole, said compressing operation reducing and shaping the exterior of the said blank to the desired form.

2. The method of forming a blind nut blank which comprises cutting a piece from a bar, shaping said piece into a form larger than and resembling the desired final product, drilling a blind hole in said piece at least equal to the outer diameter of the desired final thread and finally compressing said piece around a cylindrical mandril whose outer diameter approximates that of the inner diameter of the desired final thread and for a length substantially less than the depth of the said drilled hole leaving a portion of the drilled hole beyond the end of the mandril unchanged in diameter forming a recess.

3. The method of making a blind nut blank which comprises shaping a piece of material to a form larger than and resembling the desired final product with a blind hole therein at least equal to the outer diameter of the final thread and then compressing said piece around a mandril having a diameter approximating that of the inner diameter of the final thread leaving a portion of the said hole unchanged in diameter forming a recess while shaping the exterior of the said piece to the desired final form.

4. The method of making a blind nut comprising in forming a blank having a portion only of the length thereof of greater diameter than the diameter of the desired final product and having a blind opening therein opening on one end thereof, said opening being of a diameter at least substantially equal to the greatest diameter of the thread desired to be formed in said nut and extending to adjacent the opposite end of said blank, then compressing said blank over the length of said portion around a mandrel having a diameter substantially equal to or less than the smallest diameter of the thread to be formed in said nut thereby reducing the diameter of the corresponding portion of said opening, and thereafter tapping the reduced portion of said opening.

EMIL A. NELSON.